United States Patent [19]

Murphy et al.

[11] Patent Number: 5,329,094
[45] Date of Patent: Jul. 12, 1994

[54] PORTABLE RADIANT HEATER FOR PERFORMING SPLICES IN WATERSTOP

[75] Inventors: Paul R. Murphy, Grosse Pointe Farms; Paul A. Kepler, Mt. Clemens, both of Mich.

[73] Assignee: Paul Murphy Plastics Company, Roseville, Mich.

[21] Appl. No.: 933,754

[22] Filed: Aug. 24, 1992

[51] Int. Cl.⁵ .................. H05B 3/02; B27G 11/02; B31F 5/04; B32B 31/00
[52] U.S. Cl. .................. 219/243; 392/440; 392/409; 392/423; 156/380.9; 156/579; 156/304.6
[58] Field of Search .............. 219/243, 221, 405, 411; 156/380.9, 304.6–307.7, 579; 392/407, 409, 410, 422–425, 440, 416; 34/202

[56] References Cited

U.S. PATENT DOCUMENTS

| 2,479,425 | 8/1949 | Steingruber | 392/440 |
| 2,722,590 | 11/1955 | Engler | 156/380.9 |
| 3,347,729 | 10/1967 | Seefluth | 156/380.9 |
| 3,472,721 | 10/1969 | Abramson et al. | 156/579 |
| 4,220,847 | 9/1980 | Focke et al. | 219/243 |
| 4,244,771 | 1/1981 | Pierce | 219/243 |
| 4,737,214 | 4/1988 | Leurink et al. | 156/158 |
| 5,130,551 | 7/1992 | Nafziger et al. | 34/202 |
| 5,241,157 | 8/1993 | Wermelinger et al. | 219/243 |

FOREIGN PATENT DOCUMENTS

| 514671 | 6/1954 | Belgium | 392/423 |
| 697115 | 11/1964 | Canada | 392/423 |
| 200329 | 11/1986 | European Pat. Off. | 156/380.9 |
| 453903 | 4/1991 | European Pat. Off. | 219/243 |
| 476166 | 5/1954 | Italy | 392/423 |
| 54-149250 | 11/1979 | Japan | 392/440 |
| 872284 | 10/1981 | U.S.S.R. | 156/380.9 |
| 744562 | 2/1956 | United Kingdom | 392/440 |

Primary Examiner—Bruce A. Reynolds
Assistant Examiner—John A. Jeffery
Attorney, Agent, or Firm—Harness, Dickey & Pierce

[57] ABSTRACT

A portable radiant heating apparatus is provided for performing splices in waterstops. The heating apparatus includes a pair of radiant quartz heating elements that are mounted intermediate the end members of a generally rectangular-shaped frame. The heating elements are preferably positioned in parallel fashion one above the other. Heat deflecting shields are mounted to the top and bottom frame members proximate to the heating elements to concentrate the radiant heat along the sides of the heating apparatus. A splicing operation is performed by positioning the ends of two waterstop sections to be joined adjacent to and on opposite sides of the heating apparatus so that the ends of the two waterstop sections are exposed to the radiant heat from the heating apparatus. Once the waterstop sections have been sufficiently heated to cause the ends thereof to begin to melt, the waterstop sections are removed from the heating apparatus and the ends therefor pressed and held together until the waterstop material cools, thereby forming a water-tight seam.

4 Claims, 2 Drawing Sheets

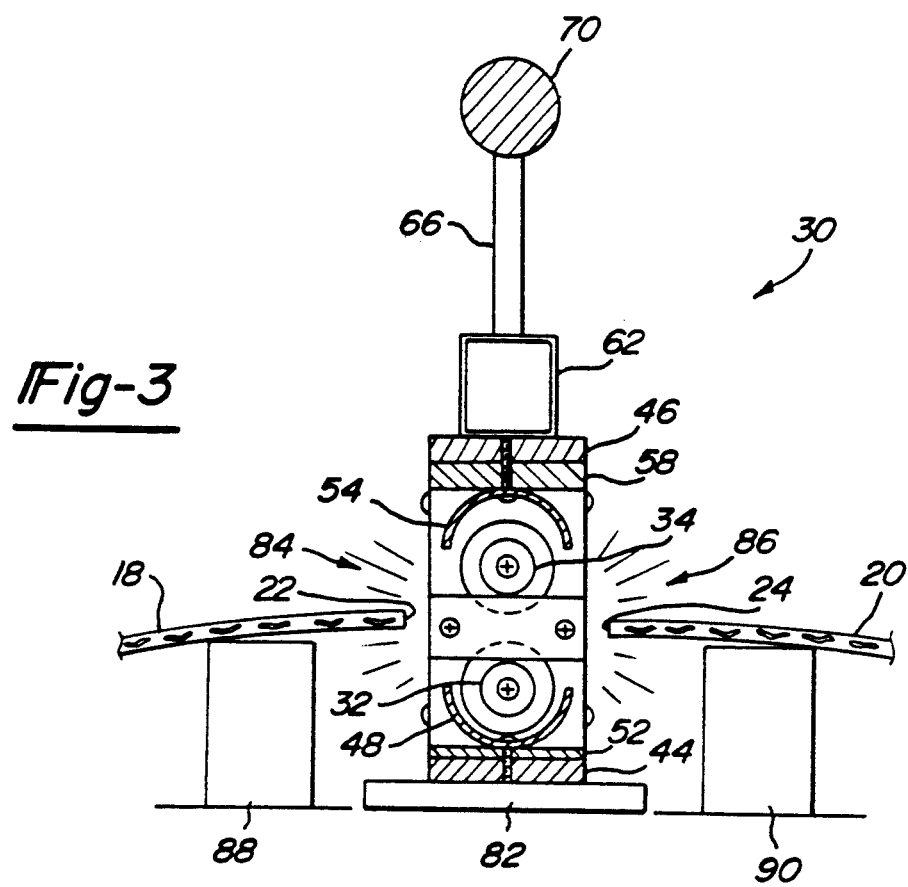
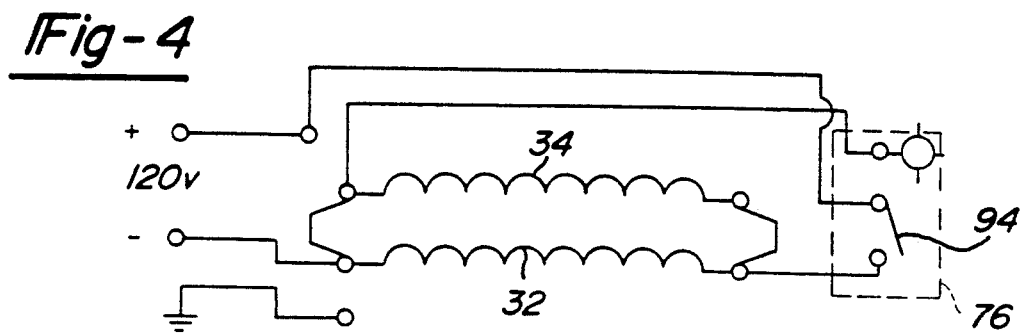
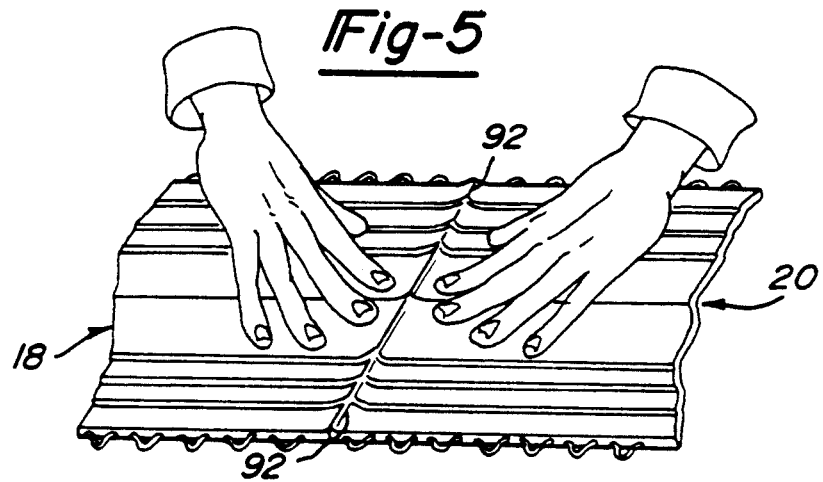

PORTABLE RADIANT HEATER FOR PERFORMING SPLICES IN WATERSTOP

BACKGROUND OF THE INVENTION

1. Technical Field

This invention relates generally to heaters for performing splicing operations in waterstops and, more particularly, to a portable radiant-type heating apparatus for such purposes.

2. Discussion

Waterstops are frequently used in the construction industry for providing a water-tight seal between adjacent layers or slabs of concrete such as between wall-to-wall, or wall-to-floor, junctions and expansion junctions. Typical waterstops are made of a resilient plastic or rubber material, such as polyvinyl chloride (PVC), and generally have some sort of integral supporting members. The integral supporting members generally have laterally extending portions which are attached to reinforcing rods of the adjacent slabs prior to the pouring of concrete. The slabs of concrete are then formed with the waterstop integrally embedded therein to thereby provide a water-tight seal between the slabs of concrete. A detailed discussion of the structure and function of a typical waterstop is contained in U.S. Pat. No. 4,285,180 issued on Aug. 25, 1981 to Hinton et al. and entitled "Waterstops".

Waterstops are generally available in rolls of flat preformed sections which frequently require splicing where adjacent sections intersect. For example, it may be necessary to splice the vertically oriented waterstop bridging the joint between two adjacent wall sections with the horizontally oriented waterstop at the juncture between the walls and the floor. The resulting spliced waterstop configuration is formed to substantially match the configuration between the slabs or layers of concrete where a continuous water-tight seal is desired. Consequently, contractors are frequently required to perform various splice configurations, such as straight butt splices, T-shaped, L-shaped, cross-shaped, and other special configurations as needed to ensure a continuous waterstop seal. In practice, the special junction configurations are typically custom ordered from the waterstop manufacturer so that the contractor need only perform the simple butt-type splices to the ends of the special junction configurations in the field. However, this practice, while simplifying the type of splice performed, multiplies the total number of splices required to be performed by the contractor. Consequently, the efficiency with which the contractor can perform a splicing operation becomes extremely important.

Conventional waterstop splicing techniques generally employ a heated splicing iron for directly contacting and melting a pair of adjacent edges of two sections of waterstop. The adjacent melted edges of waterstop are then pressed together and cooled to harden and thereby form a continuous water-tight seal. Conventional splicing irons have generally employed resistance heating elements which are in direct thermal contact with a conductive metal casing. The conventional splicing iron is heated and positioned to directly contact the edges of waterstop to be spliced together.

The direct contact of the conventional splicing iron with the adjacent edges of waterstop may burn the PVC or other resilient material. The burned material may weaken the waterstop seal and further cause a charring effect and/or leave undesired contaminants within the seal. In addition, a conventional splicing iron usually requires 15 to 20 minutes to heat up and typically reaches a maximum temperature of approximately 480° F. The rather lengthy heat-up time is time consuming and therefore costly to the contractor, especially when multiplied over hundreds of splices. In addition, the maximum temperature of conventional splicing irons may be inadequate to effectively perform waterstop splicing in very cold weather conditions which are common in the construction business.

It is therefore an object of the present invention to provide for an improved heating apparatus for performing splices in waterstops which does not suffer from the above-mentioned limitations associated with the conventional splicing iron. In particular, it is an object of the present invention to provide a portable radiant heating apparatus for performing splices in waterstops which does not require direct physical contact with the edges of the waterstop. In addition, it is another object of the present invention to provide a portable radiant heating apparatus which rapidly generates very high temperature radiant heat and therefore may be effectively and efficiently employed even in adverse weather conditions.

SUMMARY OF THE INVENTION

In accordance with the teachings of the present invention, an improved radiant heating apparatus is provided for performing splices in waterstops. The heating apparatus includes a pair of radiant heating elements for generating radiant heat sufficient to uniformly soften the ends of adjoining sections of waterstop positioned in close proximity to and on opposite sides of the heating apparatus. A support assembly is provided for mounting the pair of radiant heating elements in a vertically spaced, horizontal orientation. Heat shields are located above and below the heating elements to concentrate the radiant heat in the regions along opposite sides of the heating elements. A splice is performed by positioning the juxtaposed ends of adjoining waterstop sections in the heated regions along the sides of the heating apparatus until the ends of the waterstop material are sufficiently softened to thereafter permit the two ends sections to be joined together and cooled to form a welded seam.

BRIEF DESCRIPTION OF THE DRAWINGS

Other objects and advantages of the present invention will become apparent to those skilled in the art upon reading the following detailed description which makes reference to the drawings in which:

FIG. 3 is a cross-sectional view of the portable radiant heater taken along line 3—3 in FIG. 2 while performing a waterstop splice;

FIG. 4 is an electrical wiring circuit diagram for the portable radiant heater in accordance with the present invention; and FIG. 5 illustrates a waterstop splice formed with the portable radiant heater in accordance with the present invention.

DETAILED DESCRIPTION OF THE PREFERRED EMBODIMENT

Figure 1:
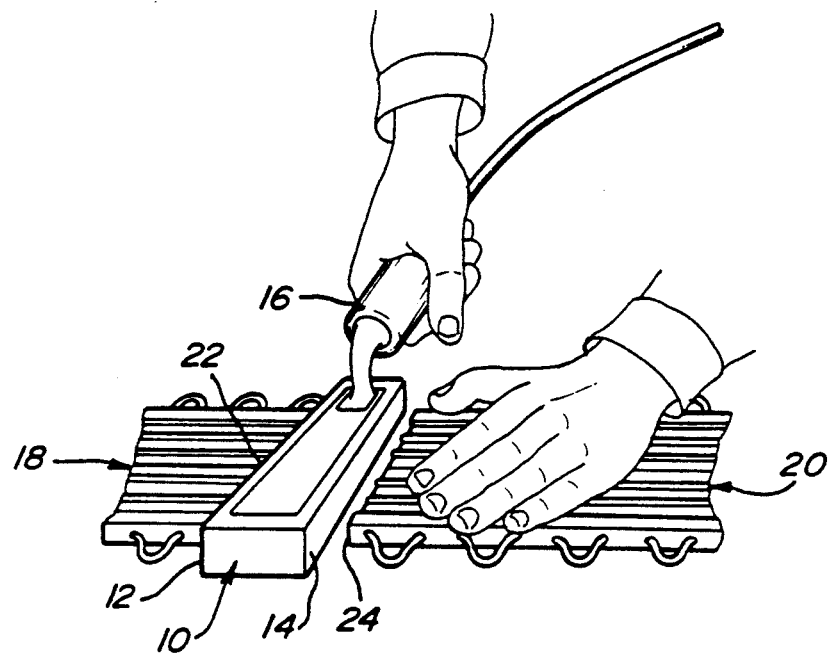
FIG. 1 is a diagram of a conventional splicing iron forming a waterstop splice in accordance with the prior art.

A conventional prior art splicing iron 10 which is typically used for performing splices in waterstops is shown in FIG. 1. The conventional splicing iron 10 comprises an insulated handle 16 connected to a generally rectangular-shaped heat-conductive metal casing which encloses and is in thermal contact with electrical resistance heating elements (not shown). The metal casing of the splicing iron 10 presents first 12 and second 14 heated contact surfaces on opposite sides thereof. In addition, conventional splicing irons generally require the addition of a Teflon ® fabric cover that is placed over the casing to prevent melted portions of the waterstops from sticking to the heated contact surfaces 12 and 14.

In accordance with the conventional splicing technique, the splicing iron 10 is positioned between the opposing ends of two waterstop sections 18 and 20. The edge surfaces 22 and 24 of the two waterstop sections 18 and 20, respectively, are then brought into contact with the heated contact surfaces 12 and 14 of the splicing iron 10, and held against the splicing iron until the ends 22 and 24 of the waterstop sections 18 and 20 begin to melt. Thereafter, the splicing iron 10 is removed and the melted edges 22 and 24 are pressed together and allowed to cool to thereby complete the formation of a water-tight splice. While the conventional splicing iron 10 has been found to be adequate, it does suffer from the numerous drawbacks discussed above.

Figure 2:
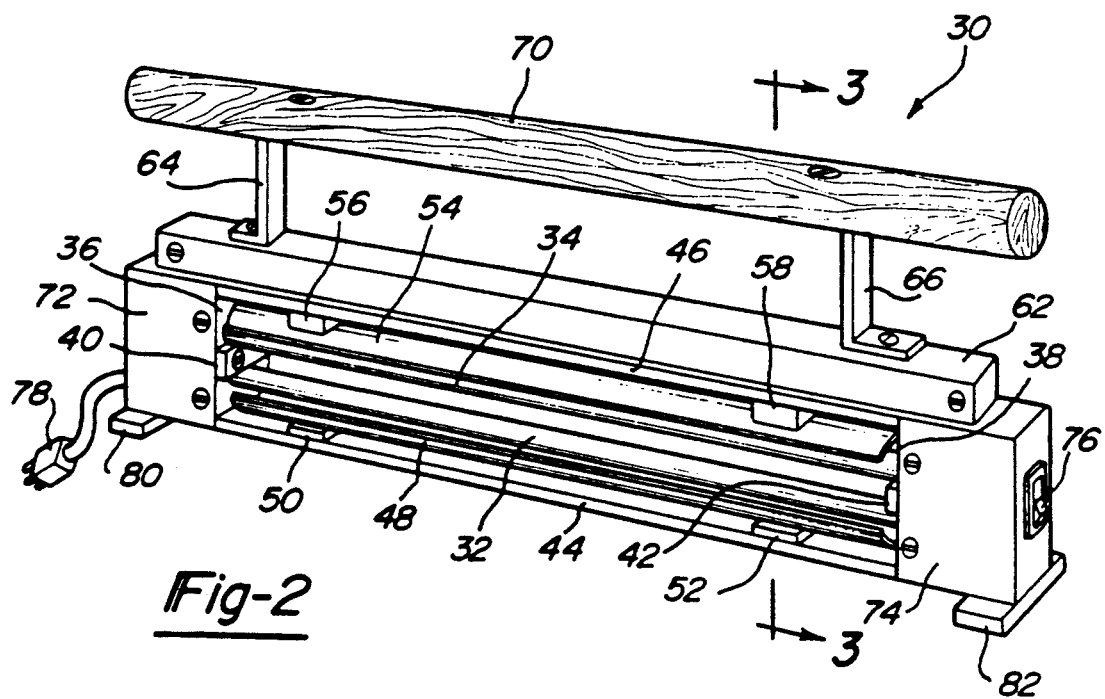
FIG. 2 is a perspective view of the portable radiant heater in accordance with the present invention.

Turning now to FIG. 2, a portable radiant heater 30 in accordance with the present invention is shown. The radiant heater 30 includes a first heating element 32 and a second heating element 34. The first and second heating elements 32 and 34 preferably comprise quartz heating bulbs which have a straight tube-shaped configuration. The quartz heating elements 32 and 34 employed in the preferred embodiment are manufactured by Tempco Electric Heater Corporation, and are rated to provide 900 watts of power from a conventional 120-volt AC power source. The quartz heating elements are capable of attaining temperatures in excess of 2,000° F. within approximately 90 seconds. Consequently, the present heater 30 is able to reach its operating temperature much more quickly than prior art heating irons which rely upon conventional electrical resistance heating elements.

The quartz heating elements 32 and 34 are horizontally disposed and arranged so that the second heating element 34 is located directly above and parallel to the first heating element 32 and separated therefrom by first and second stop blocks 40 and 42 located at opposite ends of the heating elements. The heating elements 32 and 34 are mounted in a rectangular-shaped frame comprised of end support members 36 and 38 which are interconnected by top and bottom frame members 46 and 44. The end support members 36 and 38 have mounted thereon plug-in female receptacles (not shown) for mechanically receiving and making electrical connection to the male terminals on the ends of the heating elements 32 and 34. End covers 72 and 74 are provided for enclosing the receptacles and the associated electrical circuitry described below. A pair of support feet 80 and 82 is included to provide stability.

A handle assembly provides convenient means for transporting the heater 30 and comprises a wooden handle 70 that is mounted to the heater 30 via a pair of brackets 64 and 66 that are bolted to a handle support member 62 that is in turn fastened to the top frame member 46.

The heater 30 preferably includes a pair of heat-reflecting shields 48 and 54 to concentrate and direct the radiated heat laterally outward from the sides of the heater. In particular, a first longitudinal, arcuate-shaped heat shield 48 is positioned directly beneath the lower heating element 32 and is mounted to the bottom frame member 44 via a pair of spacers 50 and 52. A similarly configured second heat shield 54 is positioned directly above the upper heating element 34 and is mounted to the top frame member 46 via a pair of spacers 56 and 58. As depicted in FIG. 3, the heat shields 48 and 54 reduce the amount of heat that radiates downward and upward from the lower 32 and upper 34 heating elements, respectively.

An ON/OFF switch 76 is mounted to end cover 74 and controls the application of power to the radiant heater 30. The switch 76 preferably has a built-in neon pilot light which is illuminated when the radiant heater 30 is energized. An electrical power cord 78 emanates from the opposite end cover 72 that is adapted to be plugged into a conventional 115-volt AC outlet. The electrical wiring diagram for the present radiant heater 30 is shown in FIG. 4. As shown in the diagram, power is supplied to the heating elements 32 and 34 through switch contacts 94 of ON/OFF switch 76. The heating elements 32 and 34 are connected in parallel with each other so that the remaining heating element will continue to function in the event that one of the elements burns out.

With particular reference to FIGS. 3 and 5, the preferred method of forming a splice between two waterstop sections using the radiant heater 30 according to the present invention will now be described. The heater elements 32 and 34 generate radiant heat, a substantial portion of which radiates outwardly from the sides of the radiant heater 30 to provide a first heated region 84 on one side and a second heated region 86 on the opposite side. The first and second heated regions 84 and 86 provide radiating heat that is sufficient to melt the resilient waterstop material.

In operation, the radiant heater 30 is positioned between the ends of two adjacent sections of waterstop 18 and 20. The end of the first waterstop 18 is preferably placed on top of a first block 88 so as to properly position the edge 22 of the waterstop 18 within the first heated region 84. Likewise, the end of the second waterstop section 20 is placed on top of a second block 90 so as to properly position the edge 24 of the second waterstop 20 within the second heated region 86.

The opposing edge portions 22 and 24 of the two waterstop sections 18 and 20 are simultaneously heated until the edge portions 22 and 24 soften and begin to melt. This transition in the state of the edge portions 22 and 24 can generally be accurately detected by the glossy appearance the resilient waterstop material assumes as it begins to melt. When the edge portions 22 and 24 have been adequately melted, the waterstop sections 18 and 20 are removed from the heater and pressed together as shown in FIG. 5, causing the formation of a bead of material 92 along the seam between the two sections. The sections 18 and 20 are then held together in the position shown in FIG. 5 for an amount of time, typically 5–10 seconds, adequate to allow the bead of liquified material 92 to cool and harden, thereby forming a water-tight seam.

Significantly, it will be appreciated that, due to the substantial amount of radiant heat produced by the present heater 30, it is unnecessary for the waterstop sections 18 and 20 to actually contact the heater in order to properly melt the edges 22 and 24. Moreover, by virtue of the radiant nature of the heating process, the end portions of the waterstop sections 18 and 20 adjacent to the edges 22 and 24 which are exposed to the heated regions 84 and 86 also absorb a substantial amount of heat energy. Consequently, when the waterstop sections 18 and 20 are removed from the heater 30, the edges 22 and 24 do not cool as quickly, thereby providing the operator with more time to carefully align the two waterstop sections 18 and 20 when joining them together as shown in FIG. 5. With conventional heating irons, on the other hand, the heating of the ends of the waterstop sections 18 and 20 is much more localized along the facing edges 22 and 24 of the waterstops. Therefore, the edges 22 and 24 are prone to cool and harden much more rapidly after being removed from the heating iron, particularly in cold weather conditions, thus providing the operator with very little time to properly position the waterstop sections and complete the splicing operation. Consequently, there is the tendency for operators under such circumstances to leave the waterstop sections 18 and 20 in contact with the heating iron longer in an attempt to more thoroughly melt the edge portions. This practice, however, greatly increases the likelihood of burning the edges 22 and 24 of the waterstops which introduces contaminants into the seam 92 and thereby increases the likelihood of a faulty seam. As a result, operators are much less apt to burn the edges 22 and 24 of the waterstop sections 18 and 20 using the radiant heater 30 of the present invention.

In accordance with a preferred embodiment of the present invention, the quartz radiant heating elements 32 and 34 are approximately 18 inches long and one-half inch in diameter. Consequently, the heating elements 32 and 34 provide an effective heating length of approximately 16½ inches which is sufficient to perform splices in waterstops up to 12 inches in width. However, the present invention may employ radiant heating elements of greater heating length to handle wider strips of waterstops, if necessary, without departing from the scope of this invention. In addition, while the preferred embodiment of the invention has been described as comprising a pair of quartz radiant heating elements 32 and 34, other configurations may be provided without departing from the scope of the invention.

While the above description constitutes the preferred embodiment of the invention, it will be appreciated that the invention is susceptible to modification, variation, and change without departing from the proper scope or fair meaning of the accompanying claims.

What is claimed is:

1. A method of performing a butt-type splice to join the edges of first and second end sections of waterstops, comprising:
    providing a portable radiant heating device having a frame defining open regions on either side thereof, an elongated quartz heating element mounted in the frame and having a length greater than the width of said waterstop sections, and heat deflection means for directing heat generated by the heating element outwardly through said open regions to thereby create first and second external heating zones adjacent to said open regions on either side of said frame;
    energizing the heating element in the heating device to radiate heat into said first and second external heating zones;
    positioning said first and second waterstop end sections in said first and second external heating zones respectively such that said end sections are subjected to said radiated heat without contacting said heating device;
    maintaining said end sections in said heating zones for a time period sufficient to soften said end sections and initiate melting of the edges thereof;
    removing said end sections from said heating zones;
    joining said end sections together so that the respective edges thereof fuse together and form a bead along the seam between said two sections; and
    holding said two end sections together until the end sections cool sufficiently to harden the bead formed along the seam.

2. The method of claim 1 wherein said quartz heating element is energized to operating temperatures in excess of 2000° F.

3. The method of claim 2 wherein said quartz heating element attains said operating temperatures within approximately 90 seconds after energization thereof.

4. The method of claim 1 wherein said heating device includes two parallel oriented quartz heating elements and said energizing step simultaneously energizes both heating elements.

* * * * *